United States Patent
Nabar et al.

(10) Patent No.: US 8,902,961 B1
(45) Date of Patent: Dec. 2, 2014

(54) FORWARD CHANNEL VARIATION DETECTION IN A WIRELESS COMMUNICATION SYSTEM

(71) Applicant: Marvell International Ltd., Hamilton (BM)

(72) Inventors: Rohit U. Nabar, Sunnyvale, CA (US); Hongyuan Zhang, Fremont, CA (US); Jungwon Lee, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/767,414

(22) Filed: Feb. 14, 2013

Related U.S. Application Data

(63) Continuation of application No. 12/168,595, filed on Jul. 7, 2008, now Pat. No. 8,379,745.

(60) Provisional application No. 60/948,304, filed on Jul. 6, 2007.

(51) Int. Cl.
  *H04L 1/00* (2006.01)
  *H04B 7/04* (2006.01)

(52) U.S. Cl.
  CPC .................................. *H04B 7/0456* (2013.01)
  USPC ......................................................... 375/225

(58) Field of Classification Search
  CPC .. H04B 7/0417; H04B 7/0617; H04B 7/0421; H04B 7/043; H04B 7/0626; H04L 2025/03426; H04L 25/0204; H04L 25/0262; H04L 1/0618; H04L 5/0001
  USPC .................. 375/225, 267, 260, 343
  See application file for complete search history.

(56) References Cited

U.S. PATENT DOCUMENTS

| 5,936,570 | A  | 8/1999  | Ghazvinian et al. |
| 5,995,039 | A  | 11/1999 | Jensen et al.     |
| 6,137,441 | A  | 10/2000 | Dai et al.        |
| 6,144,711 | A  | 11/2000 | Raleigh et al.    |
| 6,496,535 | B2 | 12/2002 | Xu                |
| 6,675,013 | B1 | 1/2004  | Gross et al.      |

(Continued)

FOREIGN PATENT DOCUMENTS

WO  WO-2007/103085  9/2007

OTHER PUBLICATIONS

U.S. Appl. No. 11/598,563, filed Nov. 13, 2006, Nabar et al.
U.S. Appl. No. 12/168,595, filed Jul. 7, 2008, Nabar et al.

(Continued)

*Primary Examiner* — Daniel Washburn
*Assistant Examiner* — Fitwi Hailegiorgis

(57) ABSTRACT

A method in a wireless communication system having a forward channel corresponding to transmissions from a first device to a second device, and a reverse channel corresponding to transmissions from the second device to the first device, includes initiating, at the first device, a first update of a steering matrix. The steering matrix is used to beamform transmissions on the forward channel. The method also includes monitoring, at the first device, a plurality of reverse channel estimates corresponding to the reverse channel, determining, at the first device, a metric indicative of a rate of change in the reverse channel based on the plurality of reverse channel estimates, and initiating, at the first device, a second update of the steering matrix based on a comparison between (i) the metric indicative of the rate of change in the reverse channel and (ii) a threshold.

15 Claims, 8 Drawing Sheets

(56) References Cited

U.S. PATENT DOCUMENTS

| | | | |
|---|---|---|---|
| 6,760,388 | B2 | 7/2004 | Ketchum et al. |
| 6,999,724 | B2 | 2/2006 | Chizhik et al. |
| 7,065,146 | B1 | 6/2006 | Lou et al. |
| 7,133,353 | B2 | 11/2006 | Sourour et al. |
| 7,194,042 | B2 | 3/2007 | Walton et al. |
| 7,742,546 | B2 | 6/2010 | Ketchum et al. |
| 7,787,554 | B1 | 8/2010 | Nabar et al. |
| 7,817,732 | B2 | 10/2010 | Gorokhov |
| 7,924,935 | B2 | 4/2011 | Tong et al. |
| 7,933,215 | B2 | 4/2011 | Schiff et al. |
| 8,081,692 | B1 | 12/2011 | Zhang et al. |
| 8,175,181 | B1 | 5/2012 | Nabar et al. |
| 8,199,841 | B1 | 6/2012 | Sarrigeorgidis et al. |
| 8,223,872 | B1 | 7/2012 | Zhang et al. |
| 8,340,597 | B1 | 12/2012 | Nabar et al. |
| 2001/0048675 | A1 | 12/2001 | Nafie et al. |
| 2004/0165684 | A1* | 8/2004 | Ketchum et al. ............... 375/343 |
| 2005/0185728 | A1 | 8/2005 | Wallace et al. |
| 2006/0165191 | A1* | 7/2006 | Lin et al. ........................ 375/267 |
| 2006/0203708 | A1 | 9/2006 | Sampath et al. |
| 2007/0275665 | A1 | 11/2007 | Molnar et al. |
| 2007/0286303 | A1* | 12/2007 | Yamaura ........................ 375/267 |
| 2008/0089396 | A1 | 4/2008 | Zhang et al. |

OTHER PUBLICATIONS

"Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.,* (1999).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.,* (1999).

IEEE P802.11g/D8.2, Apr. 2003 (Supplement to ANSI/IEEE Std 802.11 1999(Reaff 2003)), "IEEE P802.11g/D8.2, Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band," *Institute of Electrical and Electronics Engineers, Inc.,* (2003).

Mujtaba, S., IEEE 802.11 Wireless LANs, "TGn Sync Proposal Technical Specification" (2005).

IEEE Std 802.16aTM-2003 (Amendment to IEEE Std. 802.16TM-2001), "IEEE Standard for Local and Metropolitan area networks, Part 16: Air Interface for Fixed Broadband Wireless Access Systems—Amendment 2: Medium Access Control Modifications and Additional Physical Layer Specifications for 2-11 GHz," *The Institute of Electrical and Electronics Engineers, Inc.,* (2003).

IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band," *The Institute of Electrical and Electronics Engineers, Inc.,* (1999).

"Part 16: Air Interface for Fixed Broadband Wireless Access Systems—Amendment 2: Medium Access Control Modifications and Additional Physical Layer Specifications for 2-11 GHz," *The Institute of Electrical and Electronics Engineers, Inc.,* (2003).

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band—Corrigendum 1," *The Institute of Electrical and Electronics Engineers, Inc.,* Nov. 7, 2001.

Cavallaro et al., "VLSI Implementation of a CORDIC SVD Processor", Eighth Biennial University/Government/Industry Symposium, pp. 256-260, 1989.

802.11 Working Group: "IEEE 802.11 n Part 11: Wireless LAN Medium Access Control (MAC) and Physical Layer (PHY) specifications: Enhancements for Higher Throughput," *IEEE* Mar. 2006, pp. 119-125.

International Search Report from corresponding International Application No. PCT/US07/78780 dated Mar. 10, 2008.

Written Opinion from corresponding International Application No. PCT/US07/78780 dated Mar. 10, 2008.

International Preliminary Report on Patentability for Application No. PCT/US2007/078780, dated Mar. 24, 2009.

\* cited by examiner

PRIOR ART

FORWARD CHANNEL VARIATION DETECTION IN A WIRELESS COMMUNICATION SYSTEM

PRIORITY CLAIM

The present application is a continuation of U.S. patent application Ser. No. 12/168,595, entitled "Forward Channel Variation Detection in a Wireless Communication System," filed on Jul. 7, 2008, now U.S. Pat. No. 8,379,745, which claims the benefit of U.S. Provisional Patent Application Ser. No. 60/948,304, entitled "Exploiting Doppler Reciprocity for Detecting Forward Link Channel Variation" and filed on Jul. 6, 2007. Both of the above-referenced applications are hereby incorporated by reference herein.

FIELD OF THE TECHNOLOGY

The disclosure relates generally to wireless communication systems and, more particularly, to techniques for detecting variations in the forward channel in a wireless communication system.

DESCRIPTION OF THE RELATED ART

An ever-increasing number of relatively inexpensive, low power wireless data communication services, networks and devices have been made available over the past number of years, promising near wire speed transmission and reliability. Various wireless technologies are described in detail in the 802 IEEE Standards, including for example, the IEEE Standard 802.11 (1999) and its updates and amendments, the IEEE Standard 802.11a/g (2003), and the IEEE Standard 802.11n that is now in the process of being adopted, all of which are collectively incorporated herein fully by reference. These standards have been or are in the process of being commercialized with the promise of 54 Mbps or more effective data rate, making them a strong competitor to traditional wired Ethernet and the more common "802.11b" or "WiFi" 11 Mbps mobile wireless transmission standard.

Generally speaking, transmission systems compliant with the IEEE 802.11a and 802.11g or "802.11a/g" as well as the 802.11n standards achieve their high data transmission rates using Orthogonal Frequency Division Modulation (OFDM) encoded symbols mapped up to a 64 quadrature amplitude modulation (QAM) multi-carrier constellation. In a general sense, the use of OFDM divides the overall system bandwidth into a number of frequency sub-bands or channels, with each frequency sub-band being associated with a respective sub-carrier upon which data may be modulated. Thus, each frequency sub-band of the OFDM system may be viewed as an independent transmission channel within which to send data, thereby increasing the overall throughput or transmission rate of the communication system.

Transmitters used in the wireless communication systems that are compliant with the aforementioned 802.11a/802.11g/802.11n standards as well as other standards such as the 802.16a/d/e/m IEEE Standards, typically perform multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a large peak-to-average ratio (PAR).

Likewise, the receivers used in the wireless communication systems that are compliant with the aforementioned 802.11a/802.11g/802.11n and 802.16a IEEE standards typically include an RF receiving unit that performs RF downconversion and filtering of the received signals (which may be performed in one or more stages), and a baseband processor unit that processes the OFDM encoded symbols bearing the data of interest. The digital form of each OFDM symbol presented in the frequency domain is recovered after baseband downconversion, conventional analog to digital conversion and Fast Fourier Transformation of the received time domain analog signal. Thereafter, the baseband processor performs frequency domain equalization (FEQ) to recover estimates of the transmitted symbols, and these estimates are then processed in a Viterbi decoder to estimate or determine the most likely identity of the transmitted symbol. The recovered and recognized stream of symbols is then decoded, which may include deinterleaving and error correction using any of a number of known error correction techniques, to produce a set of recovered signals corresponding to the original signals transmitted by the transmitter.

In wireless communication systems, the RF modulated signals generated by the transmitter may reach a particular receiver via a number of different propagation paths or channels, the characteristics of which typically change over time due to the phenomena of multi-path and fading, transmitter and/or receiver movement. A propagation channel is generally described as a real number or a sequence of complex numbers determined based on the physical conditions or environment (e.g., signal-scattering objects or media, reflectors, etc.) that affect propagation between the transmitter and receiver, and a signal propagating through the channel is transformed by the environment. For example, the signal may experience superposition, deflections, attenuation or phase rotation during propagation, all of which may be due, in part, to the characteristics of the channel as determined by the environment. Moreover, the characteristics of a propagation channel differ or vary based on the frequency of propagation and/or based on changes in the environment. To compensate for the time varying, frequency selective nature of the propagation effects, and generally to enhance effective encoding and modulation in a wireless communication system, each receiver of the wireless communication system may periodically develop or collect channel state information (CSI) for each of the frequency channels, such as the channels associated with each of the OFDM sub-bands discussed above. Generally speaking, CSI is information describing one or more characteristics of each of the OFDM channels (for example, the gain, the phase and the SNR of each channel). Upon determining the CSI for one or more channels, the receiver may send this CSI back to the transmitter, which may use the CSI for each channel to precondition the signals transmitted using that channel so as to compensate for the varying propagation effects of each of the channels.

An important part of a wireless communication system is therefore the selection of the appropriate data rates, and the coding and modulation schemes to be used for a data transmission based on channel conditions. Generally speaking, it is desirable to use the selection process to maximize throughput while meeting certain quality objectives, such as those defined by a desired frame error rate (FER), latency criteria, etc.

To further increase the number of signals which may be propagated in the communication system and/or to compensate for deleterious effects associated with the various propagation paths, and to thereby improve transmission performance, it is known to use multiple transmit and receive antennas within a wireless transmission system. Such a system is commonly referred to as a multiple-input, multiple-output (MIMO) wireless transmission system and is specifically provided for within the 802.11n IEEE Standard now being adopted. As is known, the use of MIMO technology produces significant increases in spectral efficiency and link reliability, and these benefits generally increase as the number of transmit and receive antennas within the MIMO system increases.

In addition to the frequency channels created by the use of OFDM, a MIMO channel formed by the various transmit and receive antennas between a particular transmitter and a particular receiver includes a number of independent spatial channels. As is known, a wireless MIMO communication system can provide improved performance (e.g., increased transmission capacity) by utilizing the additional dimensionalities created by these spatial channels for the transmission of additional data. Of course, the spatial channels of a wideband MIMO system may experience different channel conditions (e.g., different fading and multi-path effects) across the overall system bandwidth and may therefore achieve different SNRs at different frequencies (i.e., at the different OFDM frequency sub-bands) of the overall system bandwidth. Consequently, the number of information bits per modulation symbol (i.e., the data rate) that may be transmitted using the different frequency sub-bands of each spatial channel for a particular level of performance may differ from frequency sub-band to frequency sub-band.

However, instead of using the different transmit and receive antennas to form separate spatial channels on which additional information is sent, better reception properties can be obtained in a MIMO system by using each of the various transmit antennas of the MIMO system to transmit the same signal while phasing (and amplifying) this signal as it is provided to the various transmission antennas to achieve beamforming or beamsteering. Generally speaking, beamforming or beamsteering creates a spatial gain pattern having one or more high gain lobes or beams (as compared to the gain obtained by an omni-directional antenna) in one or more particular directions, while reducing the gain over that obtained by an omni-directional antenna in other directions. If the gain pattern is configured to produce a high gain lobe in the direction of each of the receiver antennas, the MIMO system can obtain better reception reliability between a particular transmitter and a particular receiver, over that obtained by single transmitter-antenna/receiver-antenna systems.

There are many known techniques for determining a steering matrix specifying the beamsteering coefficients that need to be used to properly condition the signals being applied to the various transmission antennas so as to produce the desired transmit gain pattern at the transmitter. As is known, these coefficients may specify the gain and phasing of the signals to be provided to the transmission antennas to produce high gain lobes in particular or predetermined directions. These techniques include, for example, transmit-MRC (maximum ratio combining) and singular value decomposition (SVD). An important part of determining the steering matrix is taking into account the specifics of the channel between the transmitter and the receiver, referred to herein as the forward channel. As a result, steering matrixes are typically determined based on the CSI of the forward channel. However, to determine the CSI or other specifics of the forward channel, the transmitter must first send a known test or calibration signal to the receiver, which then computes or determines the specifics of the forward channel (e.g., the CSI for the forward channel) and then sends the CSI or other indications of the forward channel back to the transmitter, thereby requiring signals to be sent both from the transmitter to the receiver and then from the receiver back to the transmitter in order to perform beamforming in the forward channel. Moreover, this exchange must occur each time the forward channel is determined (e.g., each time a steering matrix is to be calculated for the forward channel). As indicated above, in order to compensate for the time varying, frequency selective nature of propagation effects, and to enhance effective encoding and modulation, the forward channel must be updated as the forward channel changes.

To reduce the amount of startup exchanges required to perform beamforming based on CSI or other channel information, it is known to perform implicit beamforming in a MIMO communication system. With implicit beamforming, the steering matrix is calculated or determined based on the assumption that the forward channel (i.e., the channel from the transmitter to the receiver in which beamforming is to be accomplished) can be estimated from the reverse channel (i.e., the channel from the receiver to the transmitter). In particular, the forward channel can ideally be estimated as the matrix transpose of the reverse channel, based on the understanding that the physical characteristics of the forward and reverse channels (i.e., the "physical channels"), are reciprocal. Thus, in the ideal case, the transmitter only needs to receive signals from the receiver to produce a steering matrix for the forward channel, as the transmitter can use the signals from the receiver to determine the reverse channel, and can simply estimate the forward channel as a matrix transpose of the reverse channel. As a result, implicit beamforming reduces the amount of startup exchange signals that need to be sent between a transmitter and a receiver because the transmitter can estimate the forward channel based solely on signals sent from the receiver to the transmitter.

Unfortunately, however, radio frequency (RF) chain impairments in the form of gain/phase imbalances and coupling losses impair the ideal reciprocity between the forward and the reverse channels, making it necessary to perform additional calibration exchanges each time the forward channel is being determined, to account for these impairments. That is, the effective forward and reverse channels (i.e., the physical channel as affected by the impairments) are not reciprocal, even if the physical forward and reverse channels are reciprocal. In any event, these RF chain impairments render the use of implicit beamforming (which estimates the forward channel based solely on an estimate of the reverse channel) inferior in practice. Further, the transmitter does not have an accurate knowledge of the variations in the forward channel, without increasing the amount of startup exchanges required to perform beamforming based on CSI or other channel information.

SUMMARY

In one embodiment, a method in a wireless communication system having a forward channel corresponding to transmissions from a first device to a second device, and a reverse channel corresponding to transmissions from the second device to the first device, includes initiating, at the first device, a first update of a steering matrix. The steering matrix is used to beamform transmissions on the forward channel. The method also includes monitoring, at the first device, a plurality of reverse channel estimates corresponding to the reverse channel, determining, at the first device, a metric indicative of a rate of change in the reverse channel based on the plurality of reverse channel estimates, and initiating, at the first device, a second update of the steering matrix based on a comparison between (i) the metric indicative of the rate of change in the reverse channel and (ii) a threshold.

In another embodiment, a communication device configured to transmit signals to a remote device via a forward channel and receive signals from the remote device via a reverse channel includes a beamforming network configured to beamform transmissions on the forward channel using a steering matrix. The communication device also includes a controller coupled to the beamforming network. The controller is configured to initiate a first update of a the steering matrix, monitor a plurality of reverse channel estimates corresponding to the reverse channel, determine a metric indicative of a rate of change in the reverse channel based on the plurality of reverse channel estimates, and initiate a second update of the steering matrix based on a comparison between (i) the metric indicative of the rate of change in the reverse channel and (ii) a threshold.

In another embodiment, a computer readable memory stores instructions that, when executed by a processor, cause the processor to initiate a first update of a steering matrix. The steering matrix is used to beamform transmissions on a forward channel corresponding to transmissions from a first device to a second device. The instructions also cause the processor to monitor a plurality of reverse channel estimates corresponding to a reverse channel. The reverse channel corresponds to transmissions from the second device to the first device. The instructions also cause the processor to determine a metric indicative of a rate of change in the reverse channel based on the plurality of reverse channel estimates, and initiate a second update of the steering matrix based on a comparison between (i) the metric indicative of the rate of change in the reverse channel and (ii) a threshold.

DETAILED DESCRIPTION

While the forward channel variation detection techniques described herein for processing and effecting a wireless data transmission are described as being used in communication systems that use one of the IEEE Standard 802.11x communication standards, these techniques may be used in various other types of wireless communication systems, such as WiMax and are not limited to those conforming to one or more of the IEEE Standard 802.11x standards.

Figure 1:
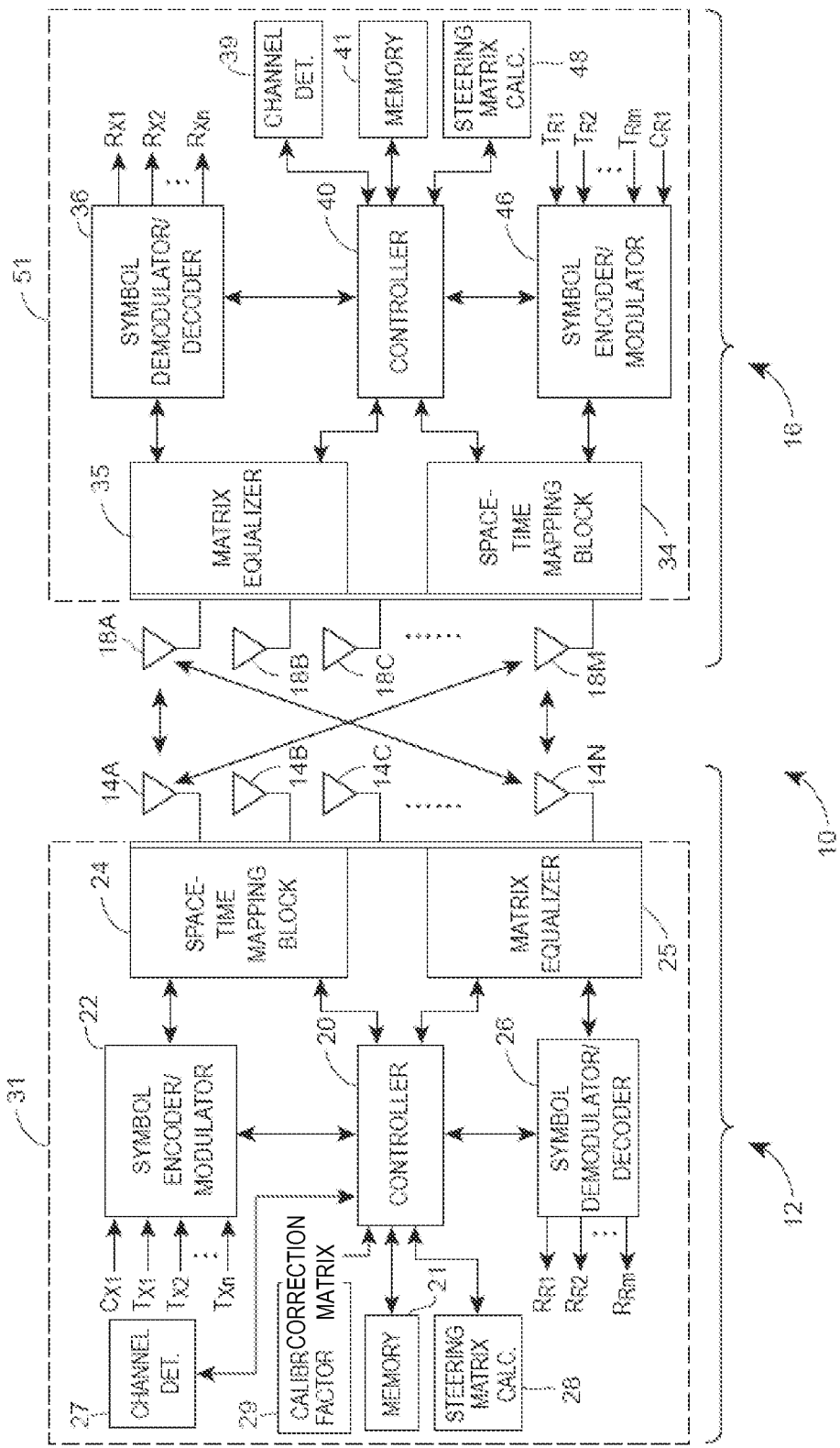
FIG. 1 is a block diagram of a wireless MIMO communication or transmission system that determines and uses a estimates of the rate of change in the reverse channel matrix as part of a beamforming technique used in a transmitter of the MIMO communication system.

Referring now to FIG. 1, a MIMO communication system 10 is illustrated in block diagram form as generally including a single transceiver device 12 (hereinafter referred to as transmitter 12) having multiple transmission antennas 14A-14N and a single transceiver device 16 (hereinafter referred to as receiver 16) having multiple receiver antennas 18A-18M. The number of transmission antennas 14A-14N can be the same as, more than, or less than the number of receiver antennas 18A-18M. As shown in FIG. 1, the transmitter 12 may include a controller 20 coupled to a memory 21, a symbol encoder and modulator unit 22 and a space-time filtering or mapping block 24, also referred to herein as a transmit beamforming network. The transmitter 12 may also include a matrix equalizer 25 and a symbol demodulator and decoder unit 26 to perform demodulation and decoding of signals received via the antennas 14A-14N in a receive mode. Additionally, the transmitter 12 includes a steering matrix calculation unit 28 and a correction matrix calculation unit 29. As will be understood, the processing applied at the transmitter 12 may be based on, for example, the CSI developed by the transmitter 12 in response to a reception of a test or control signal CR1 sent by the receiver 16. In particular, a controller 40 or other unit within the receiver 16, such as a channel determination unit 27, may process the received control signal CR1 and develop therefrom a measured description of the reverse channel between the transmitter 12 and the receiver 16 by determining or characterizing the propagation effects of the reverse channel on the signal CR1 as it traveled through the reverse channel.

The controller 20 may be any desired type of controller and may be implemented as one or more standard multi-purpose, programmable processors, such as micro-processors, as application specific integrated circuits (ASICs), or may be implemented using any other desired types of hardware, software and/or firmware. The channel determination unit 27, the steering matrix calculation unit 28 and the correction matrix calculation unit 29 may be implemented as one or more custom integrated circuits, ASICs, field programmable gate arrays (FPGAs), programmable logic arrays (PLAs), programmable processors, such as micro-processors or digital signal processing processors, or may be implemented using any other desired types of hardware, software and/or firmware. Likewise, the space-time mapping block 24 or beamforming network, and the matrix equalizer 25 may be implemented using known or standard hardware and/or software elements. If desired, various of the transmitter components, such as the controller 20, the modulator unit 22, the demodulator unit 26, the channel determination unit 27, the steering matrix calculation unit 28, the correction matrix calculation unit 29, the space-time mapping block 24 and the matrix equalizer 25 may be implemented in the same or in different hardware devices, such as in the same or different processors. Additionally, each of these components of the transmitter 12 may be disposed in a housing 31 (shown in dotted relief in FIG. 1) and the routines or instructions for implementing the functionality of any of these components may be stored in the memory 21 or within other memory devices associated with the individual hardware used to implement these components.

During operation, information signals $T_{x1}$-$T_{xn}$ which are to be transmitted from the transmitter 12 to the receiver 16 are provided to the symbol encoder and modulator unit 22 for encoding and modulation. Of course, any desired number of signals $T_{x1}$-$T_{xn}$ may be provided to the modulator unit 22, with this number generally being limited by the modulation scheme used by and the bandwidth associated with the MIMO communication system 10. Additionally, the signals $T_{x1}$-$T_{xn}$ may be any type of signals, including analog or digital signals, and may represent any desired type of data or information. Additionally, if desired, a known test or control signal $C_{x1}$ (which may be stored in the memory 21) may be provided to the symbol encoder and modulator unit 22 for use in determining CSI related information describing the characteristics of the channel(s) between the transmitter 12 and the receiver 16. If desired, the same control signal or a different control signal may be used to determine the CSI for each frequency and/or spatial channel used in the MIMO communication system 10.

The symbol encoder and modulator unit 22 may interleave digital representations of the various signals $T_{x1}$-$T_{xn}$ and $C_{x1}$ and may perform any other known type(s) of error-correction encoding on the signals $T_{x1}$-$T_{xn}$ and $C_{x1}$ to produce one or more streams of symbols to be modulated and sent from the transmitter 12 to the receiver 16. While the symbols may be modulated using any desired or suitable QAM technique, such as using 64 QAM, these symbols may be modulated in any other known or desired manner including, for example, using any other desired phase and/or frequency modulation techniques. In any event, the modulated symbol streams are provided by the symbol encoder and modulator unit 22 to the space-time mapping block 24 for processing before being transmitted via the antennas 14A-14N. While not specifically shown in FIG. 1, the modulated symbol streams may be up-converted to the RF carrier frequencies associated with an OFDM technique (in one or more stages) before being processed by the space-time mapping block 24 in accordance with a beamforming technique more specifically described herein. Upon receiving the modulated signals, the space-time mapping block 24 or beamforming network processes the modulated signals by injecting delays and/or gains into the modulated signals based on a steering matrix provided by the controller 12, to thereby perform beamsteering or beamforming via the transmission antennas 14A-14N.

The signals transmitted by the transmitter 12 are received by the receiver antennas 18A-18M and may be processed by a matrix equalizer 35 within the receiver 16 to enhance the reception capabilities of the antennas 18A-18M. As will be understood, the processing applied at the receiver 16 (as well as at the transmitter 12) may be based on, for example, the CSI developed by the receiver 16 in response to the transmission of the test or control signal $C_{x1}$. In particular, a controller 40 or other unit within the receiver 16, such as a channel determination unit 39, may process the received control signal $C_{x1}$ and develop therefrom a measured description of the forward channel between the transmitter 12 and the receiver 16 by determining or characterizing the propagation effects of the forward channel on the signal $C_{x1}$ as it traveled through the forward channel. In any event, a symbol demodulator and decoder unit 36, under control of the controller 40, may decode and demodulate the received symbol strings as processed by the matrix equalizer 35. In this process, these signals may be downconverted to baseband. Generally, the demodulator and decoder unit 36 may operate to remove effects of the forward channel based on the CSI as well as to perform demodulation on the received symbols to produce a digital bit stream. In some cases, if desired, the symbol demodulator and decoder unit 36 may perform error correction decoding and deinterleaving on the bit stream to produce the received signals $R_{x1}$-$R_{xn}$ corresponding to the originally transmitted signals $T_{x1}$-$T_{xn}$.

As shown in FIG. 1, the receiver 16 may also include a memory 41 and a symbol encoder and modulator unit 46 which may receive one or more signals $T_{R1}$-$T_{Rn}$, which may be encoded and modulated using any desired encoding and modulation techniques. The receiver 16 may also provide one or more known test or control signals $C_{R1}$ to the symbol encoder/modulator unit 46 to be sent to the transmitter 12 to enable the transmitter 12 to determine a measured description of the reverse channel between the receiver 16 and the transmitter 12. The encoded and modulated symbol stream may then be upconverted and processed by a space-time mapping block 34 to perform beamsteering based on a steering matrix developed by a steering matrix calculation unit 48, prior to being transmitted via the receiver antennas 18A-18N to, for example, the transmitter 12, thereby implementing the reverse link. As shown in FIG. 1, each of the receiver components may be disposed in a housing 51.

The matrix equalizer 25 and the demodulator/decoder unit 26 within the transmitter 12 operate similarly to the matrix equalizer 35 and the demodulator/decoder unit 36 of the receiver 16 to demodulate and decode the signals transmitted by the receiver 16 to produce the recovered signals $R_{R1}$-$R_{Rm}$. Here again, the matrix equalizer 25 may process the received signals in any known manner to enhance the separation and therefore the reception of the various signals transmitted by the antennas 18A-18M. Of course, the CSI or other measured description of the forward channel for the various OFDM channel(s) may be used by the steering matrix calculation units 28 and 48 as well as by the controllers 20 and 40 to perform beamforming and to determine a steering matrix used by the space-time mapping blocks 24, 34. As noted above, the CSI, beamforming and other programs and data such as the steering matrix used by the units 28 and 48 and by the controllers 20 and 40, a correction matrix determined by the correction matrix calculation unit 29, etc. may be stored in the memories 21 and 41.

As is generally known, beamforming or beamsteering typically includes applying appropriate phases and gains to the various signals as sent through the multiple transmission antennas 14A-14N, in a manner which causes the signals sent from the different transmission antennas 14A-14N to constructively interact (add in phase) in certain predetermined directions and to deconstructively interact (cancel) in other directions. Thus, beamsteering typically produces a beam pattern having high gain regions (referred to as high gain lobes) in various predetermined directions and low gain regions (typically referred to as nulls) in other directions. The use of beamforming techniques in a MIMO system enables a signal to be sent with high gain (as compared to an omni-directional antenna) in certain directions, and to be sent with low gain (as compared to an omni-directional antenna) in other directions. Thus, in the MIMO system 10 of FIG. 1, beamforming may be used to enhance signal directivity towards the receiver antennas 18A-18M, which improves the SNR of the transmissions and results in more reliable transmissions. In this case, the beamforming technique will generally form high gain lobes in the direction of propagation at which the highest gain is desired, and in particular in the directions of propagation from the transmitter 12 to each of the receiver antennas 18A-18M of the receiver 16 or to the receiver 16 in general.

To implement beamforming in the transmitter 12, the steering matrix calculation unit 28 may determine or calculate a set of matrix coefficients (referred to herein as a steering matrix) which are used by the space-time mapping block or beamforming network 24 to condition the signals being transmitted by the antennas 14A-14N. Generally speaking, the steering matrix for any particular frequency channel of the MIMO system 10 (in the forward channel between the transmitter 12 and the receiver 16) may be determined by the steering matrix calculation unit 28 based on the CSI determined for that forward channel. In this case, the steering matrix calculation unit 28 may use any desired beam steering or matrix computation techniques, such as transmit-MRC or SVD techniques, to compute the steering matrix. As these techniques are well known in the art, they will not be discussed in detail herein.

However, as is known, to actually determine the CSI or other measured description of the forward channel, i.e., for the channel from the transmitter 12 to the receiver 16, the transmitter 12 generally sends a known control or test (sounding) signal to the receiver 16 (e.g., the signal $C_{x1}$) and the receiver 16 may then determine the CSI or other measured description of the forward channel and send this information back to the transmitter 12 as part of a payload of a transmission. In the event of explicit beamforming, in this case, the transmitter 12 must first send a test or control signal to the receiver 16 which then determines a measured description of the forward channel and sends this description of the forward channel from the receiver 16 back to the transmitter 12. This characterization of the forward channel thereby requires, each time the steering matrix is computed, multiple communications between the transmitter 12 and the receiver 16 so as to enable the transmitter 12 to obtain the CSI or other description of the forward channel used to develop the steering matrix to be used in the forward channel. In explicit transmit beamforming, RF chain imbalance should not impact the beamforming performance, as the forward channel is explicitly known. Additionally, in the case of implicit beamforming, to avoid the use of multiple communication between a particular transmitter/receiver pair each time a steering matrix is to be computed for the forward channel, the transmitter 12 may determine the CSI or other measured description of the reverse channel, i.e., the channel from the receiver 16 to the transmitter 12, from the signal(s) sent from the receiver 16 including, for example the known test or control signal $C_{R1}$. Based on the CSI or other measured description of the reverse channel, the transmitter 12 may calculate the steering matrix for the forward channel.

To reduce or account for the errors introduced by RF chain impairments in a standard implicit beamforming technique, the transmitter 12 may use a calibration technique that applies a correction matrix during the beamforming process to compensate for measured differences between the actual forward and reverse channels. An example of a calibration technique is described in U.S. application Ser. No. 11/857,297 entitled "Calibration Correction for Implicit Beamforming in a Wireless MIMO Communication System," filed on Sep. 18, 2007, the contents of which are expressly incorporated by reference herein. In particular, this technique first determines a correction matrix as a function of measured descriptions of the forward and the reverse channels. Then, each time a new steering matrix is to be calculated for the forward channel, the beamforming technique applies the correction matrix to a steering matrix determined using a basic implicit beamforming technique, so that, once the correction matrix is determined, the transmitter may simply perform implicit beamforming using a measured description of the reverse channel (i.e., the channel between the receiver and the transmitter) to produce an estimate of the forward channel (i.e., the channel between the transmitter and the receiver). Alternatively, the transmitter 12 may also calculate correction matrices for its receive chains, so that once the correction matrix is determined, the transmitter may apply it to the reverse channel (i.e., the channel from the receiver 16 to the transmitter 12) estimation, and perform implicit beamforming using a measured description of this processed reverse channel estimate to produce an estimate of the forward channel (i.e., the channel from the transmitter 12 to the receiver 16). The calibration procedure may be conducted infrequently, compared with steering matrix updates. For example, it may be conducted only upon association of the device into the network, or upon the changes in the environment (e.g. a change in temperature).

Transmission from the transmitter 12 (Station A) to the receiver 16 (Station B) can be modeled as:

$$y_B = \tilde{H}_{AB} Q_A x_A + n_B \qquad \text{(Equ. 1)}$$

where $y_B$ and $n_B$ are the received signal vector and additive noise vector at Station B, respectively; $\tilde{H}_{AB}$ is the equivalent effective channel from Station A to Station B; $x_A$ is the signal vector to be transmitted from Station A; and $Q_A$ is the steering matrix (which may be a vector) at Station A that spreads the signal vector onto actual transmitting chains at Station A. $Q_A$ may be designed based on the knowledge of $\tilde{H}_{AB}$ at station A using the forward channel variation detection techniques described herein. In the transmitter 12, the steering matrix $Q_A$ may be determined by the steering matrix calculation unit 28 based, for example, on the CSI determined for the channel from the transmitter 12 to the receiver 16. The initial steering matrix $Q_A$ may be determined using a variety of techniques, including techniques known to those of ordinary skill in the art. However, as disclosed herein, forward channel variation detection may be used to recalculate or update the steering matrix $Q_A$ for transmit beamforming, and may further be used to recompute the modulation and coding supported by the channel for channel link adaptation. As mentioned above, transmit beamforming may include either implicit beamforming and/or explicit beamforming. The forward channel variation detection technique described herein is equally applicable to both implicit and explicit beamforming. In particular, a different protocols may be used to update the steering matrix when sufficient variation in the reverse link channel is detected using the forward channel variation detection technique described herein, depending on whether implicit or explicit beamforming is conducted. However, it should be understood that while the forward channel variation detection technique may be used to determine whether or not the steering matrix needs to be updated, the protocol that is actually used to update the steering matrix is not central to the forward channel variation technique. Accordingly, the protocols may include known protocols for updating the steering matrix based on implicit and/or explicit beamforming.

In implicit transmit beamforming, Station A determines an estimate of $\tilde{H}_{AB}$ based on an estimate of the channel from Station B to Station A. In the case of time-division duplexing (TDD), the forward link and the reverse link share the same frequency band, so their physical propagation channels, denoted as $H_{AB}$ and $H_{BA}$ respectively, can be assumed reciprocal ($H_{AB} = H_{BA}^T$), if the channel is varying slowly compared to the interval between forward and reverse link transmissions. However, the actual channels observed at baseband also include the equivalent radio frequency (RF) responses of the transmit and receive chains, which might not be identical for the transmit and receive chains in the same device. This imbalance results in the actual channels $\tilde{H}_{AB}$ and $\tilde{H}_{BA}$ not being reciprocal.

In order to update the steering matrix or recompute the modulation and coding, Station A determines an estimate of variation in $H_{AB}$ based on an estimate of variation in the channel $H_{BA}$ from Station B to Station A.

In order to determine if the forward channel estimate needs to be updated due to variations in the channel, which in turn may require recalculating the steering matrix using implicit beamforming and recomputing the coding and modulation for link adaptation if the changes are significant, the transmitter 12 may use a forward channel variation detection that utilizes Doppler reciprocity between the forward and reverse channels. That is, Station A determines an estimation of variations in $H_{AB}$ based on an estimate of variations in the channel $H_{BA}$ from Station B to Station A. As noted above, the forward and reverse propagation channels, $H_{AB}$ and $H_{BA}$ respectively, can be assumed reciprocal. In particular, this channel reciprocity exists between the various sub-channels or spatial channels between Station A and Station B:

$$H_{AB}(k) = H_{BA}^T(k) \quad \text{(Equ. 2)}$$

where $HB_A$ (k) is the matrix transpose of $H_{AB}$, and k is the sub-band of the channel H, such as the channels associated with OFDM channels. Accordingly, Doppler reciprocity exists for the physical forward and reverse propagation channels, such that variations in the physical forward channel are reflected in the physical reverse channel (and vice versa), provided that equation 1 above holds true.

For the effective forward and reverse channels, $\tilde{H}_{AB}$ and $\tilde{H}_{BA}$ respectively, Doppler reciprocity exists when the physical channel elements are uncorrelated. That is, in a channel having multiple sub-bands or sub-channels within the channel as in an OFDM communication system, or having multiple spatial channels as in a MIMO communication system, Doppler reciprocity exists if the sub-channels or spatial channels are independent, such that that status of one sub-channel or spatial channel does necessarily reflect the status of another sub-channel or spatial channel. By contrast, correlated channel elements exist if all sub-channels or spatial channels are active at the same time or inactive at the same time. Doppler reciprocity tends to degrade with increasing levels of correlation. For the purpose of forward channel variation detection discussed herein, some levels of correlations (low to mild) are tolerated. As a result, Doppler reciprocity is more easily realized for the effective channel as opposed to channel reciprocity.

Although the transmitter 12 is generally unable to monitor variations in the forward channel without resending a sounding packet and receiving CSI from the receiver 16, the transmitter 12 does receive data packets on the reverse channel $\tilde{H}_{BA}$, and therefore is able to estimate the reverse channel and monitor variations therein. Although the example described herein makes occasional reference to data packets, the forward channel variation detection technique is not limited to utilizing data packets. For example, the forward channel variation detection technique may also be implemented based on the transmitter 12 receiving acknowledgement packets (AWK) or sounding packets on the reverse link. However, it is noted that for successful Doppler detection, it is preferable to compare channels between similar kinds of packets (e.g., data-to-data packets or ACK-to-ACK packets). Accordingly, reference to data packets should not be construed as a limitation to just data packets, but rather include any reverse link packet.

The Doppler spectrum from the reverse channel may be estimated by monitoring N channel estimates on the reverse channel:

$$H_i(t), i=1,2,\ldots,N \quad \text{(Equ. 3)}$$

where t is the time instant that a data packet is first received on the reverse channel after a beamformed signal was transmitted on the forward channel. That is, t is the time between a beamformed transmission sent from Station A to Station B and a first data packet is received thereafter at Station A from Station B. The selected channel estimates may relate to multiple tones for one transmit-receive antenna pair, for example in a MIMO communication system, or the selected channel estimates may be randomly selected across multiple tones and multiple transmit-receive antenna pairs.

Because the transmitter 12 is able to estimate the Doppler spectrum of the reverse channel, which is a measure of a rate of change of the reverse channel, from an averaged metric that measures the rate of change of the individual channel estimates $H_i(t)$, the transmitter 12 may use Doppler reciprocity to estimate the Doppler spectrum of the forward channel and thereby estimate variations in the forward channel. When the estimate of reverse channel variations, the transmitter 12 uses that knowledge to estimate a corresponding change in the forward channel. If the change is significant, e.g., by a predetermined threshold, the transmitter 12 may initiate the appropriate process or protocol to update the steering matrix and modulation and coding, depending on whether implicit or explicit beamforming is being conducted. The particulars of the threshold may depend on a variety of factors, including environment (e.g., indoor, outdoor, etc.). For example, the Doppler spectrum of the reverse channel may be simulated during development of the transmitter 12, but the actual Doppler spectrum observed during use of the transmitter 12 may differ from the simulated version. Accordingly, the threshold values may be dynamic and/or may be user-defined or programmable as needed, as understood by those of ordinary skill in the art, and need not be discussed further herein.

The Doppler spectrum of the reverse channel may be estimated or utilized in a variety of manners, including, direct frequency domain estimation of the Doppler spectrum and time domain estimation of a correlation between reverse channel estimate upon receipt of different packets on the reverse link. Further, both the frequency and time domain estimates may account for phase variations in the estimated reverse channel, where phase variations do not affect the effective channel, but may nonetheless affect the channel estimate.

Direct frequency domain estimation of the Doppler spectrum of the reverse channel may be performed by transforming the channel estimate $H_i(t)$ of the reverse channel to the frequency domain and determining the power in the frequency domain for that channel at different frequency shifts. For example, the Doppler spectrum for a channel estimate at time instant t+lT, where t is the first time instant for receiving the first reverse link packet after transmitting a beamformed packet and lT represents successive time instants for receiving subsequent data packets in intervals of T, may be expressed as:

$$S(p) = \frac{1}{N}\sum_{i=1}^{N}\left|\sum_{l=0}^{L-1}H_i(t+lT)e^{-\frac{j2\pi lp}{L}}\right|^2 \quad \text{(Equ. 4)}$$

where $$\sum_{l=0}^{L-1}H_i(t+lT)e^{-\frac{j2\pi lp}{L}}$$

is a Fast Fourier Transform of the channel estimate $H_i$, p is the Doppler shift index that is associated with a frequency in the spectrum to estimate how fast the channel is changing (p=0, 1, ..., L−1), and L is the number of packets received from the receiver 16 on the reverse channel after the first beamformed transmission. As seen from Equation 4, the absolute value of the Fourier transform of channel estimate $H_i(t+lT)$ is squared to determine the associated energy of channel estimate $H_i$ at shift index p. As also seen from Equation 4, this energy is averaged over all N channel estimates for the selected Doppler shift index (i.e., the selected frequency). The result is the Doppler spectrum S(p) at a chosen Doppler shift index p, where S(0) is the energy corresponding to the minimum Doppler shift and S(L−1) is the energy corresponding to the maximum Doppler shift.

The Doppler spectrum S(p) may then be normalized:

$$\hat{S}(p) = \frac{S(p)}{\sum_{m=1}^{L-1} S(m)} \quad \text{(Equ. 5)}$$

It is noted that the above frequency domain estimation of the Doppler spectrum assumes uniformly sampled channel estimates, where reverse link packets are received at regular intervals of lT. Although the above frequency domain estimation is useful, reverse link packet traffic in the reverse link is most often non-uniform, such that the packets are received at non-uniform intervals. Accordingly, in practice, transmitter 12 may monitor just two samples in time such that the number of shift indices p may be restricted to L=2, where S(0) remains the minimum Doppler shift energy, and S(1) is the maximum Doppler shift energy at the first successive packet thereafter. $\hat{S}(1)$ then represents variations in the reverse channel, and when $\hat{S}(1)$ exceeds a predetermined threshold, the transmitter 12 may initiate the process to update the steering matrix and possibly the modulation and coding. With L=2, Equation 4 is essentially a differential operation analogous to finding the rate of change of a function between the first data packet after sounding and the successive data packet. It should be understood that the successive data packet at time instant t+lT does not necessary need to be the data packet received from the receiver 16 immediately after the first data packet at the first time instant t.

It is recognized that the frequency domain Doppler spectrum estimation above may result in some loss of Doppler resolution for small values of T. That is, moderate to small Doppler components may not be detected. For example, when L=2, the Doppler resolution is coarse (i.e., Doppler components are binned into one of two frequencies: very low or very high). If T is small, the Doppler components will be binned with a higher probability into the very low category (unless the channel variation is very high), thereby resulting in a loss of resolution.

Accordingly, an alternative approach is to utilize the effects of Doppler reciprocity by estimating a correlation in the time domain among packets received on the reverse channel. In particular, a correlation coefficient $R(\Delta T)$ is determined by looking at the channel estimate upon receipt of the first reverse link packet after the first beamformed transmission at time t and looking at the channel estimate upon receipt of a subsequent reverse link packet at some time thereafter $t+\Delta T$. The subsequent packet need not be the packet immediately after the first reverse link packet after sounding, and the difference in time $\Delta T$ is dependent on when the receiver 16 sends the packet rather than being dependent upon a packet sent at a uniform interval.

Using channel estimates $H_i(t)$ and $H_i(t+\Delta T)$, the transmitter may derive a correlation between the channel estimates at time instances t and $t+\Delta T$, expressed as $R(\Delta T)$. When the correlation between the channel estimates falls below a threshold, the transmitter 12 may adjust accordingly by initiating the process to update the steering matrix and possibly the modulation and coding. Again, the threshold may be dynamic and programmable to reflect the actual Doppler spectrum experienced by the reverse channel. In particular, the correlation coefficient is derived by monitoring N channel estimates on the reverse channel:

$$R(\Delta T) = \left| \frac{\sum_{i=1}^{N} H_i(t) H_i^*(t+\Delta T)}{\sqrt{\left(\sum_{i=1}^{N} H_i(t) H_i^*(t)\right)\left(\sum_{i=1}^{N} H_i(t+\Delta T) H_i^*(t+\Delta T)\right)}} \right| \quad \text{(Equ. 6)}$$

where $H^*_i$ is the conjugate transpose of $H_i$. This time domain approach represents a more feasible implementation, because the transmitter 12 is just comparing correlations from the first reverse link packet after beamformed transmission and a subsequent reverse link packet. If there is a strong correlation in the channel estimates at time instances t and $t+\Delta T$, then there is an indication of little change in the reverse channel. On the other hand, if there is low correlation in the channel estimates at time instances t and $t+\Delta T$, as seen by a lower value of $R(\Delta T)$, then there has been a change in the reverse channel. If the change is significant enough, the transmitter 12 may react accordingly by initiating the process or protocol to update the steering matrix and possibly the modulation and coding.

In both the frequency domain approach and the time domain approach, phase variations may have an effect on the estimation of the reverse channel. For example, the channel may not change or only change slightly. However, the transmission times of the first data packet after sounding and the subsequent data packet may be different due to system impairments, rather than channel effects or RF impairments. The system impairments are not indicative of the propagation channel, but the resulting timing errors nonetheless translate to phase variations. This difference in timing causes linear phase shifts across the frequency domain channel. As a result, a transmitter 12 monitoring the reverse channel may interpret these phase variations as part of the reverse channel. If the phase variations are large enough, the channel may become decorrelated and the transmitter 12 may mistakenly determine a change in the channel, even if the physical channel has not decorrelated. That is, the estimated Doppler spectrum may appear larger than it actually is in the frequency domain approach, or the correlation coefficient may appear smaller than it actually is in the time domain approach.

In order to account for these phase variations, the amplitude of the channel estimates may be utilized. By using just the amplitude of the channel estimates at time instances t and $t+\Delta T$, where $\Delta T=lT$ in Equation 4, and subtracting out the mean value (the amplitude having a non-zero mean), any phase variations may be compensated for in Equations 4 and 6. For example, in the frequency domain approach, the transmitter 12 may compensate for phase variations by monitoring just the amplitudes of the frequency domain representation of the channel coefficient in order to remove the phase variation. In the time domain approach, the transmitter 12 may compensate for phase variations by monitoring the correlation between the amplitudes of the channel estimates.

As discussed above, compensation for phase variation effects in the channel estimates may be performed by taking out the mean over all N channel estimates. Accordingly, the phase-compensated reverse channel estimate $\tilde{H}_i$ at time instant t is expressed as:

$$\tilde{H}_i(t) = |H_i(t)| - \frac{1}{N}\sum_{i=1}^{N}|H_i(t)| \qquad \text{(Equ. 7)}$$

where $$|H_i(t)|$$

is the amplitude of the i-th channel estimate at time instant t, and $$\frac{1}{N}\sum_{i=1}^{N}|H_i(t)|$$

is the mean of the channel estimate $H_i$ at time instant t for all tones or channels. Likewise, the phase variation compensated reverse channel estimate at time instant t+ΔT is expressed as:

$$\tilde{H}_i(t+\Delta T) = |H_i(t+\Delta T)| - \frac{1}{N}\sum_{i=1}^{N}|H_i(t+\Delta T)| \qquad \text{(Equ. 8)}$$

where $$|H_i(t+\Delta T)|$$

is the amplitude of the channel estimate at time instant t+ΔT for tone $$\frac{1}{N}\sum_{i=1}^{N}|H_i(t+\Delta T)|$$

is the mean of the channel estimate H at time instant t+ΔT for all tones.

Accordingly, the phase variation compensated channel estimates $\tilde{H}_i$ for time instances t and t+ΔT may be substituted into Equations 4 and 6 above to account for phase variations in the frequency domain approach and the time domain approach, respectively. For example, the time domain correlation approach may derive the correlation coefficient by monitoring N phase variation compensated channel estimates on the reverse channel:

$$\tilde{R}(\Delta T) = \left| \frac{\sum_{i=1}^{N}\tilde{H}_i(t)\tilde{H}_i^*(t+\Delta T)}{\sqrt{\left(\sum_{i=1}^{N}\tilde{H}_i(t)\tilde{H}_i^*(t)\right)\left(\sum_{i=1}^{N}\tilde{H}_i(t+\Delta T)\tilde{H}_i^*(t+\Delta T)\right)}} \right| \qquad \text{(Equ. 9)}$$

Figure 2:
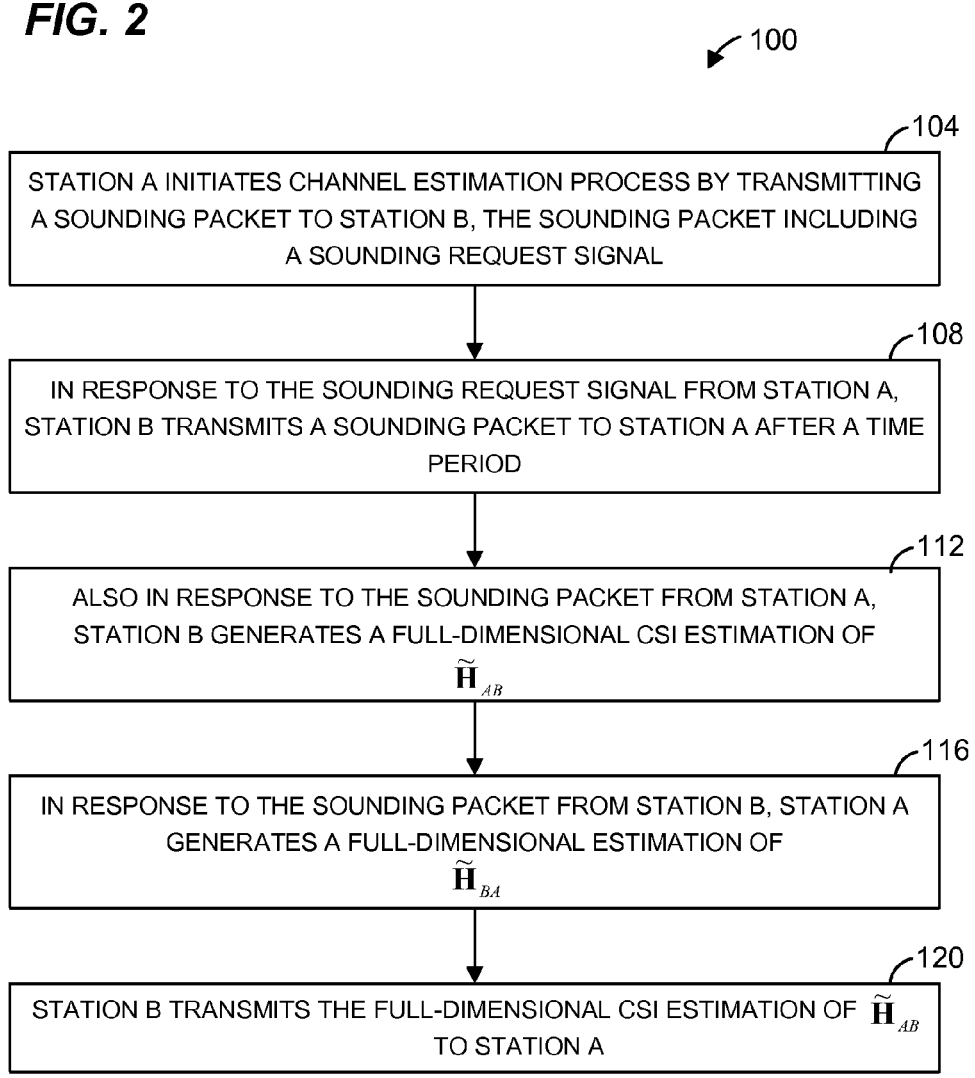
FIG. 2 is a flow diagram of a prior art method for determining forward and reverse channels in a wireless network.
Figure 3:
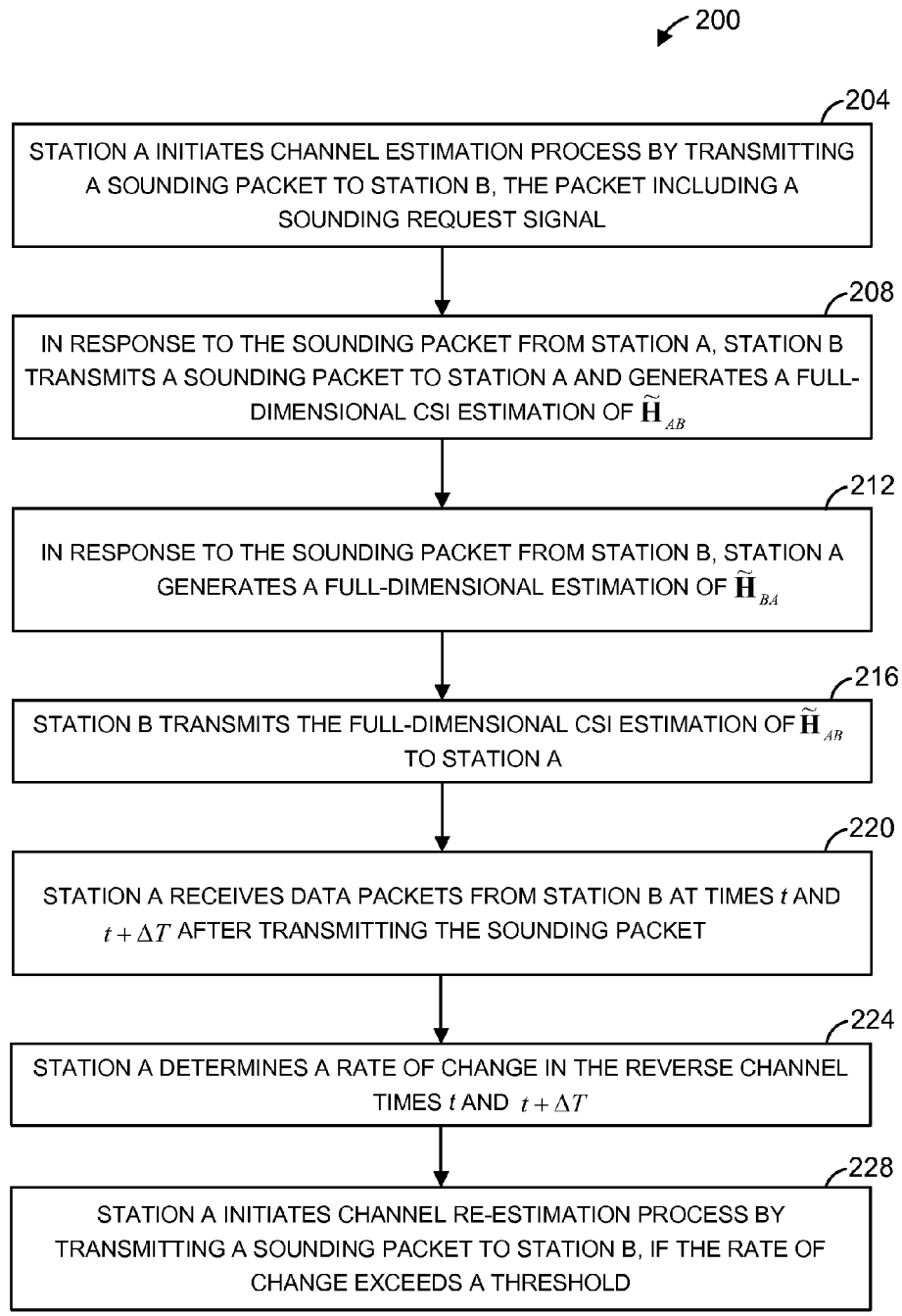
FIG. 3 is a flow diagram of an example method for estimating variations in the forward and reverse channels in a station in a wireless network.

FIGS. 2 and 3 are described below with reference to beamforming using sounding packets and data packets. However, as discussed above, the forward channel variation detection technique is not limited to either explicit or implicit beamforming, as it may be utilized with both forms of beamforming where only the protocol used to update the steering matrix may differ. For example, while the information exchange in FIGS. 2 and 3 are used for calibration in implicit beamforming, such an exchange is not central to the forward channel variation detection technique, and FIG. 3 simply provides an example of how the forward channel variation detection technique may be implimited vis-à-vis the prior art shown in FIG. 2. As such, it will be understood that to update the steering matrix in the case of implicit beamforming the transmitter sends a sounding request signal to the receiver and the receiver responds with a sounding signal. For the case of explicit beamforming the transmitter sends a sounding signal to the receiver and the receiver sends back the channel state information. In either case, the forward channel estimation variation technique determines when the transmitter should initiate the above exchange (i.e., when the forward channel is estimated to have sufficiently changed based on the reverse channel), whether the exchange be implicit or explicit. As also discussed above, the forward channel variation technique is not limited to utilizing data packets, but instead may utilize any reverse link packet, such as acknowledgement packets or sounding packets, provided the comparison to detect reverse channel varation is between the same packet type (i.e., data-to-data, ACK-to-ACK, etc.). Accordingly, FIGS. 2 and 3 and the discussion associated therewith are exemplary only, and should not be construed as limiting the disclosure of the forward channel variation detection technique.

FIG. 2 is a flow diagram of a prior art method 100 for determining the forward and reverse channel estimates at a transmitting station in a wireless network. At a block 104, Station A initiates an estimation process by sending a sounding packet to Station B. A sounding packet is a physical layer packet in a packet switched wireless network that contains training information for all available spatial dimensions of a multiple-antenna channel. The sounding packet sent at the block 104 includes a "sounding request" signal, which indicates to Station B that Station A is requesting that Station B transmit a sounding packet to Station A.

At a block 108, in response to receiving the sounding packet with the sounding request signal, Station B transmits a sounding packet after a time period, which is defined by the wireless network requirement, and in general should be short. For example, in draft IEEE 802.11n WLANs, the time period is 16 microseconds, and is referred to as the short inter-frame space (SIFS). At a block 112, also in response to receiving the sounding packet with the sounding request signal, Station B generates a full-dimensional channel state information (CSI) estimation of $\tilde{H}_{AB}$.

At a block 116, in response to receiving the sounding packet from Station B, Station A generates an estimate of the full-dimensional reverse channel $\tilde{H}_{BA}$ based on the training information in the sounding packet. At a block 120, after Station B generates the full-dimensional CSI estimation of $\tilde{H}_{AB}$, Station B transmits it back to Station A via a CSI feedback packet. According to many wireless network protocols, transmission of the CSI feedback packet typically is not considered time critical.

In the prior art method 100, generation of the sounding packet by Station B is a relatively time-critical task because the sounding packet should be transmitted after a relatively short time period. Thus, complex/expensive hardware in Station B is required so that the sounding packet can be generated quickly. Additionally, a single sounding packet includes enough information for calibrating every receiver chain of the Station A. Because the sounding packet will be received by multiple receiver chains of the Station A, the sounding packet includes more information than is necessary for Station A.

FIG. 3 is a flow diagram of an example method 200 for estimating variations in the forward and reverse channels and transmitting a sounding packet in response thereto, as performed in a station in a wireless network. At a block 204, Station A initiates a channel estimation process by sending a sounding packet to Station B. The sounding packet is the same or similar to the sounding packet of FIG. 2. The sounding packet sent at the block 204 includes a "sounding request" signal, which indicates to Station B that Station A is requesting that Station B transmit a sounding packet to Station A.

At a block 208, in response to receiving the sounding packet with the sounding request signal, Station B transmits a sounding packet after a time period as above in FIG. 2. Also at a block 208, Station B generates a full-dimensional channel state information (CSI) estimation of $\tilde{H}_{AB}$. At a block 212, in response to receiving the sounding packet from Station B, Station A generates an estimate of the full-dimensional reverse channel $\tilde{H}_{BA}$ based on the training information in the sounding packet. At a block 216, Station B transmits the full-dimensional CSI estimation of $\tilde{H}_{AB}$ back to Station A via a CSI feedback packet.

After developing an initial estimate of the forward and reverse channels $\tilde{H}_{AB}$ and $\tilde{H}_{BA}$, Station B transmits data packets to Station A on the reverse channel at block 220. The first data packet after sounding is received at time instant t, and a subsequent data packet is received at a time instant t+ΔT thereafter. Using the data packets at time instances t and t+ΔT, Station A monitors the reverse channel and determines a rate of change in the reverse channel at block 224, where the rate of change is the Doppler spectrum as directly determined in the frequency domain in accordance with the technique described in relation to Equation 4 or the rate of change is expressed as a correlation coefficient determined in the time domain in accordance with the technique described in relation to Equation 6. Whether in the frequency domain or time domain, multiple channel estimates N corresponding to sub-channels and/or spatial channels within the full-dimensional reverse channel $\tilde{H}_{BA}$ are monitored at the above time instances. The channel estimate may belong to multiple tone of one transmit-receive antenna pair or belong to randomly-selected multiple tones and multiple transmit-receive antenna pairs are monitored. In either the time domain or frequency domain technique, Station A may account for phase variation effects in the estimation of the reverse channel.

Station A may use the corresponding estimates of the rate of change in the reverse channel $\tilde{H}_{BA}$ to estimate a rate of change in the forward channel $\tilde{H}_{AB}$, with the principle of Doppler reciprocity holding if channel correlation is low or nonexistent. That is, the rate of change in the reverse channel is used by Station A to estimate a corresponding rate of change in the forward channel. If a threshold value in the rate of change is exceeded, either by exceeding a threshold value for the Doppler shift or by falling below a threshold value for the correlation coefficient as determined by Station A at block 228, Station A may transmit a new sounding packet to Station B in accordance with block 204 and repeat the process 200. In sending a new sounding packet, Station A may in turn recalculate the steering matrix for the forward channel and recomputed the modulation and coding using standard techniques for the same. As an alternative, instead of transmitted a sounding packet based on the estimate of variations in the forward channel, the transmitting station (Station A) may execute implicit beamforming using existing techniques in response to the forward channel estimate techniques described herein.

Figure 4:
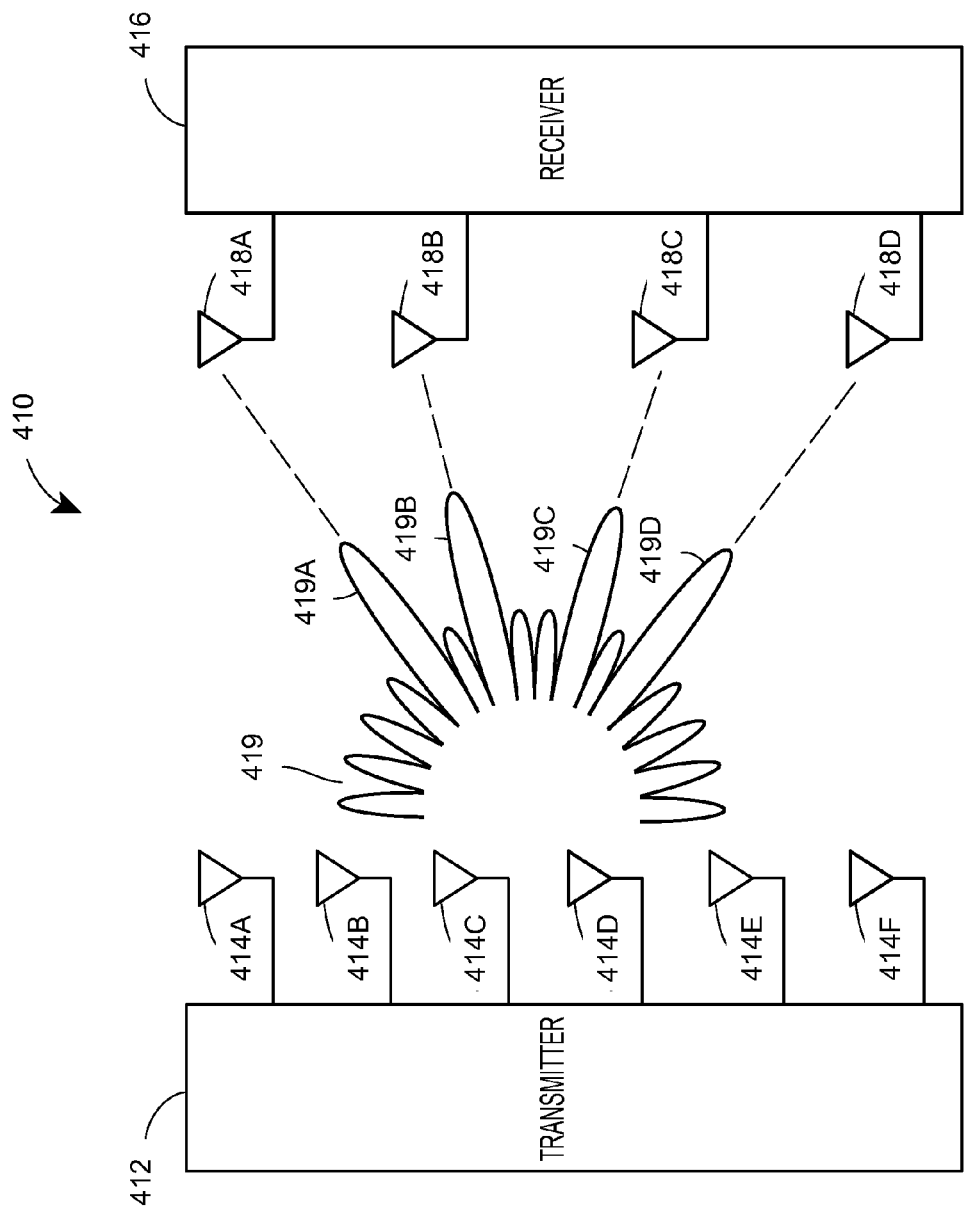
FIG. 4 is a block diagram illustrating a transmit gain pattern for wireless communications between a single transmitter and a single receiver implementing a forward channel variation technique.

To illustrate the techniques described herein, FIG. 4 shows a MIMO communication system 410 having a single transmitter 412 with six transmission antennas 414A-414F, and a single receiver 416 with four receiver antennas 418A-418D. In this example, the steering matrix is developed by the transmitter 412 to create a transmit gain pattern 419 as shown disposed next to the transmitter 412 in response to variations estimated in the forward channel by monitoring the reverse channel in the manner described above. As illustrated in FIG. 4, the transmit gain pattern 419 includes multiple high gain lobes 419A-419D generally disposed in the directions of the receiver antennas 418A-418D. The high gain lobes 419A-419D are orientated in the directions of propagation from the transmitter 412 to the particular receiver antennas 418A-418D while lower gain regions, which may even include one or more nulls, are produced in other directions of propagation. While FIG. 4 illustrates a separate high gain lobe directed to each of the receiver antennas 418A-418D, it will be understood that the actual gain pattern produced by the beam steering matrix calculations using implicit or explicit beamforming may not necessarily include a separate high gain lobe for each of the receiver antennas 418A-418D. Instead, the gain pattern developed by the beam steering matrix for the transmitter 412 may have a single high gain lobe covering or directed generally to more than one of the receiver antennas 418A-418D. Thus, it is to be understood that the beam pattern resulting from the creation of a steering matrix using implicit or explicit beamforming may or may not have separate high gain lobes separated by low gain regions or nulls for each of the receiver antennas.

Of course, developing the beam pattern 419 to have high gain regions and low gain regions may be performed in any desired manner and location. For example, any of the components within the receiver 16 of FIG. 1, including the controller 40, the steering matrix calculation unit 48 and the channel determination unit 39 may initially determine the CSI or other measured description of the forward channel and, if desired may determine the right singular matrixes for the forward channel from this information. The receiver 16 may then send any of this determined information to the transmitter 12. If desired, however, the receiver 16 may simply collect the known signal received from the transmitter 12 and may send this signal back to the transmitter 12 without processing this signal in any significant manner, and the transmitter 12 may then determine the measured description of the forward channel from this information. In either case, the controller 20 and/or the steering matrix calculation unit 28 and/or the correction matrix calculation unit 29 within the transmitter 12 may use information determined about the reverse channel to calculate and estimate variations in the reverse channel that are assumed to exist in the forward channel via Doppler reciprocity, thereby resulting in modifying the steering matrix and/or using the space-time mapping block 24 to implement beamforming in the forward channel, along with modulation and coding.

Of course, the beamforming technique described herein is not limited to being used in a transmitter of a MIMO communication system communicating with a single receiver of the MIMO communication system, but can additionally be applied when a transmitter of a MIMO communication system is communicating with multiple receivers, each of which has one or more receiver antennas associated therewith. In this case, the transmitter may perform or implement a separate correction matrix calculation for each receiver to which the transmitter will transmit and may therefore develop a different steering matrix and/or correction matrix for each of the possible receivers, and may use those steering matrixes to beamform to the separate or different receivers at different times or using different channels, e.g., OFDM channels, of the system. Moreover, while the maximum gains of the high gain lobes of each of the transmit gain patterns illustrated in FIG. 4 are shown as being the same, the steering matrix calculation units 28 and 48 may develop steering matrixes which produce high gain lobes with differing maximum gains.

While the forward channel variation detection techniques described herein are described in one example as being implemented in hardware, these calculations alternatively or additionally be implemented in software stored in, for example, one of the memories 21, 41 and implemented on a processor associated with one or both of the controllers 20, 40, the steering matrix calculation units 28, 48 and/or the units 29 and 39 of the MIMO communication system 10 of FIG. 1, or implanted in firmware as desired. If implemented in software, the routines may be stored in any computer readable memory such as in RAM, ROM, flash memory, a magnetic disk, a laser disk, or other storage medium. Likewise, this software may be delivered to a MIMO system device (such as a transmitter or a receiver) via any known or desired delivery method including, for example, over a communication channel such as a telephone line, the Internet, a wireless connection, etc., or via a transportable medium, such as a computer-readable disk, flash drive, etc.

More generally, the various blocks, operations, and techniques described above may be implemented in hardware, firmware, software, or any combination of hardware, firmware, and/or software. When implemented in hardware, some or all of the blocks, operations, techniques, etc. may be implemented in, for example, a custom integrated circuit (IC), an application specific integrated circuit (ASIC), a field programmable logic array (FPGA), a programmable logic array (PLA), etc.

When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism.

The forward channel variation detection techniques may be embodied in any type of wireless communication system including, for example, ones used in wireless computer systems such as those implemented via a local area network or a wide area network, internet, cable and satellite based communication systems (such as internet, data, video and voice communication systems), wireless telephone systems (including cellular phone systems, voice over internet protocol (VoIP) systems, home-based wireless telephone systems, etc.) Referring now to FIGS. 5A-5H, various example devices that may embody the forward channel variation detection techniques are shown.

Figure 5A:
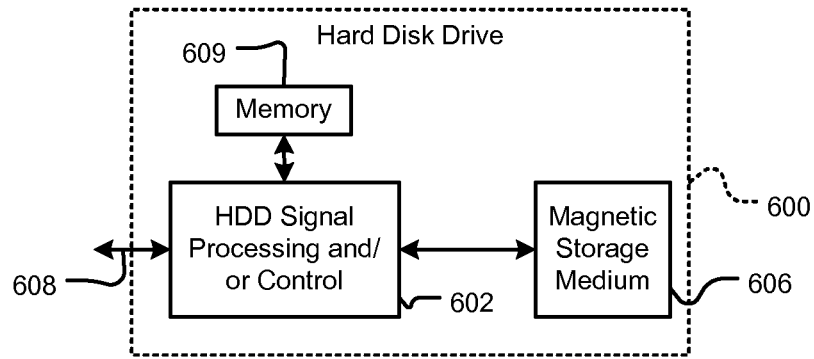
FIGS. 5A-5H illustrate examples of various different devices in which a wireless communication system implementing the antenna selection and training techniques described herein may be used.

Referring to FIG. 5A, the forward channel variation detection techniques may be used with a hard disk drive 400 which includes both signal processing and/or control circuits, which are generally identified in FIG. 5A at 402. In some implementations, signal processing and/or control circuit 402 and/or other circuits (not shown) in HDD 400 may process data, perform coding and/or encryption, perform calculations, and/or format data that is output to and/or received from a magnetic storage medium 406.

HDD 400 may communicate with a host device (not shown) such as a computer, mobile computing devices such as personal digital assistants, cellular phones, media or MP3 players and the like, and/or other devices via one or more wired or wireless communication links 408 which may implement the forward channel variation detection techniques described above. HDD 400 may be connected to memory 409, such as a random access memory (RAM), a low latency nonvolatile memory such as flash memory, read only memory (ROM) and/or other suitable electronic data storage.

Figure 5B:
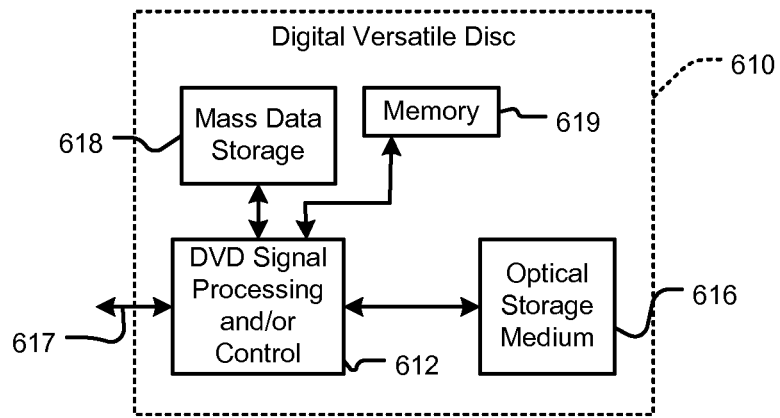

Referring now to FIG. 5B, the forward channel variation detection techniques may be embodied in or used with a digital versatile disc (DVD) drive 410 which may include either or both signal processing and/or control circuits, which are generally identified in FIG. 5B at 412, and/or mass data storage 418 of DVD drive 410. Signal processing and/or control circuit 412 and/or other circuits (not shown) in DVD 410 may process data, perform coding and/or encryption, perform calculations, and/or format data that is read from and/or data written to an optical storage medium 416. In some implementations, signal processing and/or control circuit 412 and/or other circuits (not shown) in DVD 410 can also perform other functions such as encoding and/or decoding and/or any other signal processing functions associated with a DVD drive.

DVD drive 410 may communicate with an output device (not shown) such as a computer, television or other device via one or more wired or wireless communication links 417 which may be implemented using the forward channel variation detection techniques described above. DVD 410 may communicate with mass data storage 418 that stores data in a nonvolatile manner. Mass data storage 418 may include a hard disk drive (HDD) such as that shown in FIG. 5A. The HDD may be a mini HDD that includes one or more platters having a diameter that is smaller than approximately 1.8". DVD 410 may be connected to memory 419, such as RAM, ROM, low latency nonvolatile memory such as flash memory, and/or other suitable electronic data storage.

The forward channel variation detection techniques described above may be utilized in various MIMO devices, or any OFDM-based communication system that estimate channel gain. For example, forward channel variation detection techniques such as described above may be utilized in base stations, access points, wireless routers, etc. Additionally, FIGS. 5A-5F illustrate various devices in which forward channel variation detection techniques such as described above, may be employed. Although the above has references many aspects of the IEEE Standard 802.11(x) communication standards, including 802.11n in particular, it should be understood that the forward channel variation detection techniques may also be applied to different wireless standards, including, but not limited to, the IEEE 802.16 Wireless MAN standard, also referred to as Worldwide Interoperability for Microwave Access (WiMAX) (i.e., 802.16a/d/e), or other systems employing the IEEE 802.16(x) family of communication standards, Digital Video Broadcasting-Terrestrial (DVB-T), Digital Audio Broadcasting (DAB), and Long Term Evolution (LTE).

Figure 5C:
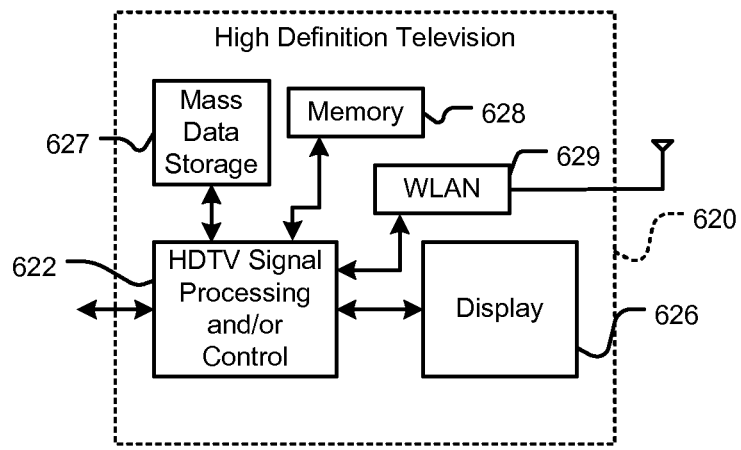

Referring now to FIG. 5C, the forward channel variation detection techniques may be embodied in a high definition television (HDTV) 420 which may include either or both signal processing and/or control circuits, which are generally identified in FIG. 5C at 422, a WLAN interface and/or mass data storage of the HDTV 420. HDTV 420 receives HDTV input signals in either a wired or wireless format and generates HDTV output signals for a display 426. In some implementations, signal processing circuit and/or control circuit 422 and/or other circuits (not shown) of HDTV 420 may process data, perform coding and/or encryption, perform calculations, format data and/or perform any other type of HDTV processing that may be required.

HDTV 420 may communicate with mass data storage 427 that stores data in a nonvolatile manner such as optical and/or magnetic storage devices. At least one HDD may have the configuration shown in FIG. 5A and/or at least one DVD may have the configuration shown in FIG. 5B. The HDD may be a mini HDD that includes one or more platters having a diameter that is smaller than approximately 1.8". HDTV 420 may be connected to memory 428 such as RAM, ROM, low latency nonvolatile memory such as flash memory and/or other suitable electronic data storage. HDTV 420 also may support connections with a WLAN via a WLAN network interface 429 which may implement the forward channel variation detection techniques described above.

Figure 5D:
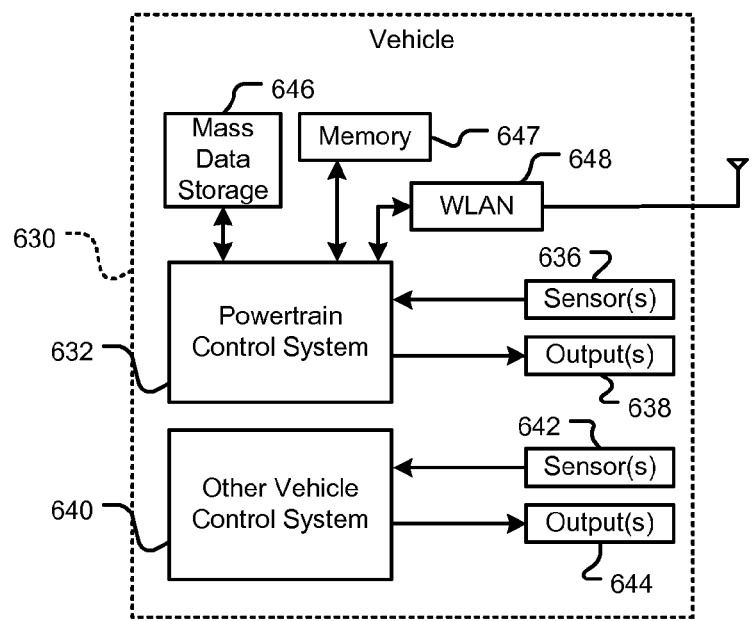

Referring now to FIG. 5D, the forward channel variation detection techniques may be used in conjunction with a control system of a vehicle 430 having a WLAN interface and/or mass data storage. In some implementations, the forward channel variation detection techniques may be used within a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The forward channel variation detection techniques may also be embodied in other control systems 440 of vehicle 430. Control system 440 may likewise receive signals from input sensors 442 and/or output control signals to one or more output devices 444. In some implementations, control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 432 may communicate with mass data storage 446 that stores data in a nonvolatile manner. Mass data storage 446 may include optical and/or magnetic storage devices for example hard disk drives HDD and/or DVDs. At least one HDD may have the configuration shown in FIG. 5A and/or at least one DVD may have the configuration shown in FIG. 5B. The HDD may be a mini HDD that includes one or more platters having a diameter that is smaller than approximately 1.8". Powertrain control system 432 may be connected to memory 447 such as RAM, ROM, low latency nonvolatile memory such as flash memory and/or other suitable electronic data storage. Powertrain control system 432 also may support connections with a WLAN via a WLAN network interface 448 which may implement the forward channel variation detection techniques described above. The control system 440 may also include mass data storage, memory and/or a WLAN interface (all not shown).

Figure 5E:
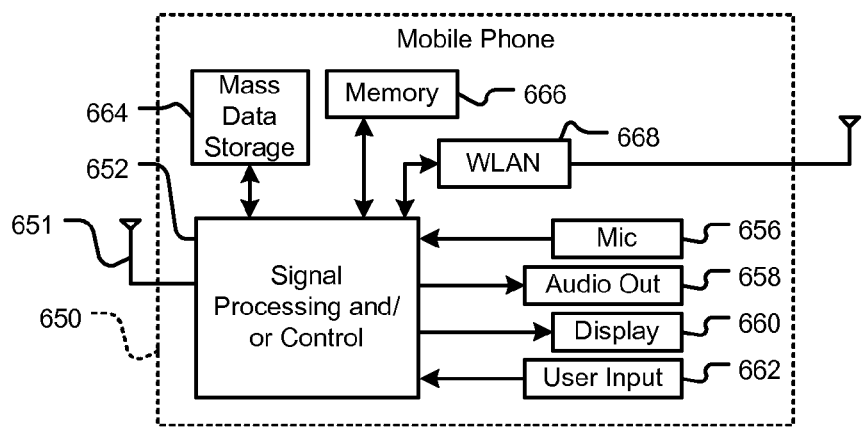

Referring now to FIG. 5E, the forward channel variation detection techniques may be embodied in a cellular phone 450 that may include one or more cellular antennas 451, either or both signal processing and/or control circuits, which are generally identified in FIG. 5E at 452, a WLAN interface and/or mass data storage of the cellular phone 450. In some implementations, cellular phone 450 includes a microphone 456, an audio output 458 such as a speaker and/or audio output jack, a display 460 and/or an input device 462 such as a keypad, pointing device, voice actuation and/or other input device. Signal processing and/or control circuits 452 and/or other circuits (not shown) in cellular phone 450 may process data, perform coding and/or encryption, perform calculations, format data and/or perform other cellular phone functions.

Cellular phone 450 may communicate with mass data storage 464 that stores data in a nonvolatile manner such as optical and/or magnetic storage devices for example hard disk drives HDD and/or DVDs. At least one HDD may have the configuration shown in FIG. 5A and/or at least one DVD may have the configuration shown in FIG. 5B. The HDD may be a mini HDD that includes one or more platters having a diameter that is smaller than approximately 1.8". Cellular phone 450 may be connected to memory 466 such as RAM, ROM, low latency nonvolatile memory such as flash memory and/or other suitable electronic data storage. Cellular phone 450 also may support connections with a WLAN via a WLAN network interface 468.

Figure 5F:
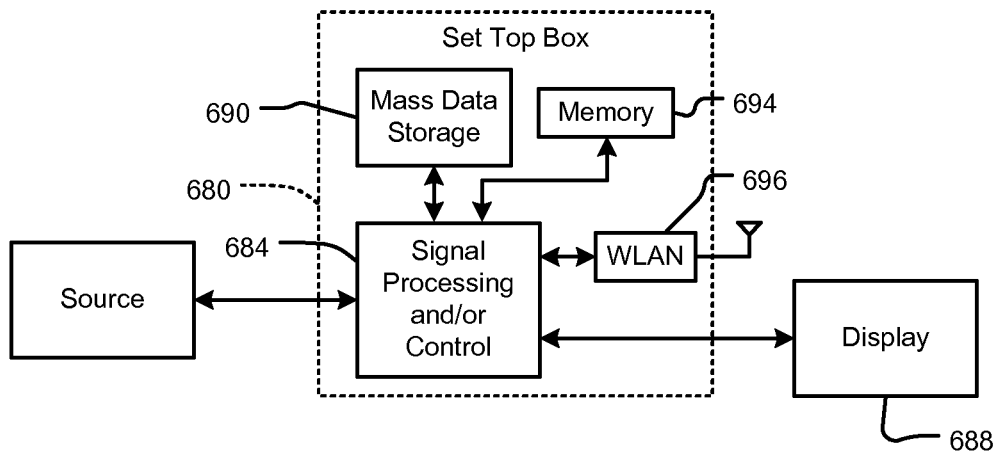

Referring now to FIG. 5F, the forward channel variation detection techniques may be embodied in a set top box 480 including either or both signal processing and/or control circuits, which are generally identified in FIG. 5F at 484, a WLAN interface and/or mass data storage of the set top box 480. Set top box 480 receives signals from a source such as a broadband source and outputs standard and/or high definition audio/video signals suitable for a display 488 such as a television and/or monitor and/or other video and/or audio output devices. Signal processing and/or control circuits 484 and/or other circuits (not shown) of the set top box 480 may process data, perform coding and/or encryption, perform calculations, format data and/or perform any other set top box function.

Set top box 480 may communicate with mass data storage 490 that stores data in a nonvolatile manner. Mass data storage 490 may include optical and/or magnetic storage devices for example hard disk drives HDD and/or DVDs. At least one HDD may have the configuration shown in FIG. 5A and/or at least one DVD may have the configuration shown in FIG. 5B. The HDD may be a mini HDD that includes one or more platters having a diameter that is smaller than approximately 1.8". Set top box 480 may be connected to memory 494 such as RAM, ROM, low latency nonvolatile memory such as flash memory and/or other suitable electronic data storage. Set top box 480 also may support connections with a WLAN via a WLAN network interface 496 which may implement the forward channel variation detection techniques described herein.

Figure 5G:
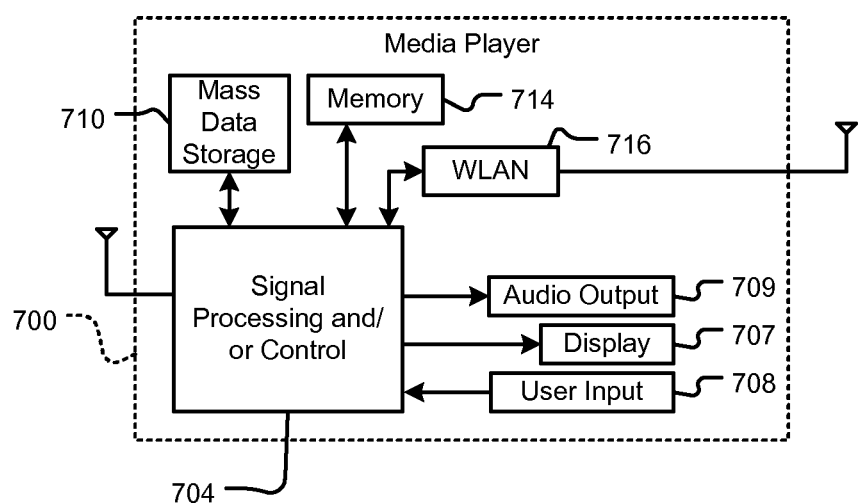

Referring now to FIG. 5G, the forward channel variation detection techniques may be embodied in a media player 500. The forward channel variation detection techniques may implement either or both signal processing and/or control circuits, which are generally identified in FIG. 5G at 504, a WLAN interface and/or mass data storage of the media player 500. In some implementations, media player 500 includes a display 507 and/or a user input 508 such as a keypad, touchpad and the like. In some implementations, media player 500 may employ a graphical user interface (GUI) that typically employs menus, drop down menus, icons and/or a point-and-click interface via display 507 and/or user input 508. Media player 500 further includes an audio output 509 such as a speaker and/or audio output jack. Signal processing and/or control circuits 504 and/or other circuits (not shown) of media player 500 may process data, perform coding and/or encryption, perform calculations, format data and/or perform any other media player function.

Media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 5A and/or at least one DVD may have the configuration shown in FIG. 5B. The HDD may be a mini HDD that includes one or more platters having a diameter that is smaller than approximately 1.8". Media player 500 may be connected to memory 514 such as RAM, ROM, low latency nonvolatile memory such as flash memory and/or other suitable electronic data storage. Media player 500 also may support connections with a WLAN via a WLAN network interface 516 which may implement the forward channel variation detection techniques described herein. Still other implementations in addition to those described above are contemplated.

Figure 5H:
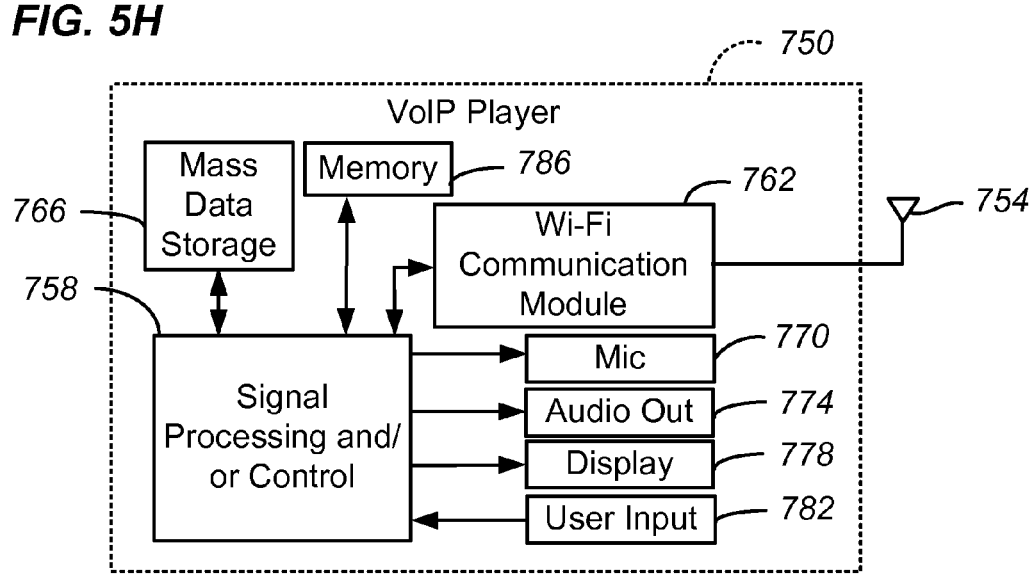

Referring to FIG. 5H, the forward channel variation detection techniques may be embodied in a Voice over Internet Protocol (VoIP) phone 600 that may include one or more antennas 618, either or both signal processing and/or control circuits, which are generally identified in FIG. 5H at 604, and a wireless interface and/or mass data storage of the VoIP phone 600. In some implementations, VoIP phone 600 includes, in part, a microphone 610, an audio output 612 such as a speaker and/or audio output jack, a display monitor 614, an input device 616 such as a keypad, pointing device, voice actuation and/or other input devices, and a Wireless Fidelity (Wi-Fi) communication module 608. Signal processing and/or control circuits 604 and/or other circuits (not shown) in VoIP phone 600 may process data, perform coding and/or encryption, perform calculations, format data and/or perform other VoIP phone functions.

VoIP phone 600 may communicate with mass data storage 602 that stores data in a nonvolatile manner such as optical and/or magnetic storage devices, for example hard disk drives HDD and/or DVDs. At least one HDD may have the configuration shown in FIG. 5A and/or at least one DVD may have the configuration shown in FIG. 5B. The HDD may be a mini HDD that includes one or more platters having a diameter that is smaller than approximately 1.8". VoIP phone 600 may be connected to memory 606, which may be a RAM, ROM, low latency nonvolatile memory such as flash memory and/or other suitable electronic data storage. VoIP phone 600 is configured to establish communications link with a VoIP network (not shown) via Wi-Fi communication module 608 which may implement the forward channel variation detection techniques described herein.

The various blocks, operations, and techniques described above may be implemented in hardware, firmware, software, or any combination of hardware, firmware, and/or software. When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

Moreover, while the forward channel variation detection techniques have been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method in a wireless communication system having a forward channel corresponding to transmissions from a first device to a second device, and a reverse channel corresponding to transmissions from the second device to the first device, the method comprising:
    initiating, at the first device, a first update of a steering matrix, wherein the steering matrix is used to beamform transmissions on the forward channel;
    determining, at the first device, (i) a first plurality of reverse channel estimates corresponding to (a) the reverse channel and (b) a first time, and (ii) a second plurality of reverse channel estimates corresponding to (a) a second time later than the first time and (b) the reverse channel;
    estimating, at the first device, a time domain correlation based on the first plurality of reverse channel estimates and the second plurality of reverse channel estimates; and
    initiating, at the first device, a second update of the steering matrix based on a comparison between (i) the time domain correlation and (ii) a threshold.

2. A method according to claim 1, wherein:
    initiating the second update of the steering matrix includes initiating the second update of the steering matrix when the time domain correlation is below the threshold.

3. A method according to claim 1, wherein the threshold is dynamic and programmable.

4. A communication device configured to transmit signals to a remote device via a forward channel and receive signals from the remote device via a reverse channel, the communication device comprising:
    a beamforming network configured to beamform transmissions on the forward channel using a steering matrix; and
    a controller coupled to the beamforming network, wherein the controller is configured to initiate a first update of the steering matrix,
    determine (i) a first plurality of reverse channel estimates corresponding to (a) the reverse channel and (b) a first time, and (ii) a second plurality of reverse channel estimates corresponding to (a) a second time later than the first time and (b) the reverse channel,
    estimate a time domain correlation based on the first plurality of reverse channel estimates and the second plurality of reverse channel estimates, and
    initiate a second update of the steering matrix based on a comparison between (i) the time domain correlation and (ii) a threshold.

5. A communication device according to claim 4, wherein the controller is configured to:

initiate the second update of the steering matrix at least in part by initiating the second update of the steering matrix when the time domain correlation is below the threshold.

6. A computer readable memory storing instructions that, when executed by a processor, cause the processor to:
   initiate a first update of a steering matrix, wherein the steering matrix is used to beamform transmissions on a forward channel corresponding to transmissions from a first device to a second device;
   determine (i) a first plurality of reverse channel estimates corresponding to (a) the reverse channel and (b) a first time, and (ii) a second plurality of reverse channel estimates corresponding to (a) a second time later than the first time and (b) the reverse channel;
   estimate a time domain correlation based on the first plurality of reverse channel estimates and the second plurality of reverse channel estimates; and
   initiate a second update of the steering matrix based on a comparison between (i) the time domain correlation and (ii) a threshold.

7. A computer readable memory according to claim 6, wherein the instructions cause the processor to initiate the second update of the steering matrix when the time domain correlation coefficient falls below the threshold.

8. A computer readable memory according to claim 6, wherein the instructions further cause the processor to account for phase variations in each of the plurality of reverse channel estimates to generate a respective phase adjusted reverse channel estimate.

9. A computer readable memory according to claim 8, wherein:
   the instructions cause the processor to account for phase variations in each of the plurality of reverse channel estimates at least in part by determining a difference between (i) an absolute value of the respective reverse channel estimate and (ii) an average absolute value of the reverse channel estimates across the reverse channel; and
   the plurality of phase adjusted reverse channel estimates comprises (i) a first phase adjusted reverse channel estimate monitored at a first time instant a first packet is received from the second device on the reverse channel after a beamformed packet was transmitted to the second device on the forward channel, and (ii) a second phase adjusted reverse channel estimate monitored at a second time instant a second packet is received from the second device on the reverse channel.

10. A method in a wireless communication system having a forward channel corresponding to transmissions from a first device to a second device, and a reverse channel corresponding to transmissions from the second device to the first device, the method comprising:
    initiating, at the first device, a first update of a steering matrix, wherein the steering matrix is used to beamform transmissions on the forward channel;
    calculating, at the first device, a first Doppler spectrum estimate based on a first packet received via the reverse channel at a first time;
    calculating, at the first device, a second Doppler spectrum estimate based on a second packet received via the reverse channel at a second time later than the first time; and
    initiating, at the first device, a second update of the steering matrix based on a comparison between (i) a difference between the first Doppler spectrum estimate and the second Doppler spectrum estimate and (ii) a threshold.

11. A method according to claim 10, wherein:
    initiating the second update of the steering matrix includes initiating the second update of the steering matrix when the difference between the first Doppler spectrum estimate and the second Doppler spectrum estimate exceeds the threshold.

12. A communication device configured to transmit signals to a remote device via a forward channel and receive signals from the remote device via a reverse channel, the communication device comprising:
    a beamforming network configured to beamform transmissions on the forward channel using a steering matrix; and
    a controller coupled to the beamforming network, wherein the controller is configured to initiate a first update of the steering matrix,
    monitor a plurality of reverse channel estimates corresponding to the reverse channel,
    calculate a first Doppler spectrum estimate based on a first packet received via the reverse channel at a first time,
    calculate a second Doppler spectrum estimate based on a second packet received via the reverse channel at a second time later than the first time, and
    initiate a second update of the steering matrix based on a comparison between (i) a difference between the first Doppler spectrum estimate and the second Doppler spectrum estimate and (ii) a threshold.

13. A communication device according to claim 12, wherein the controller is configured to:
    initiate the second update of the steering matrix at least in part by initiating the second update of the steering matrix when the difference between the first Doppler spectrum estimate and the second Doppler spectrum estimate exceeds the threshold.

14. A computer readable memory storing instructions that, when executed by a processor, cause the processor to:
    initiate a first update of a steering matrix, wherein the steering matrix is used to beamform transmissions on a forward channel corresponding to transmissions from a first device to a second device;
    monitor a plurality of reverse channel estimates corresponding to a reverse channel, wherein the reverse channel corresponds to transmissions from the second device to the first device;
    calculate a first Doppler spectrum estimate based on a first packet received via the reverse channel at a first time;
    calculate a second Doppler spectrum estimate based on a second packet received via the reverse channel at a second time later than the first time; and
    initiate a second update of the steering matrix based on a comparison between (i) a difference between the first Doppler spectrum estimate and the second Doppler spectrum estimate and (ii) a threshold.

15. A computer readable memory according to claim 14, wherein the first packet is received from the second device on the reverse channel after a beamformed packet was transmitted to the second device on the forward channel.

* * * * *